Figure 1:
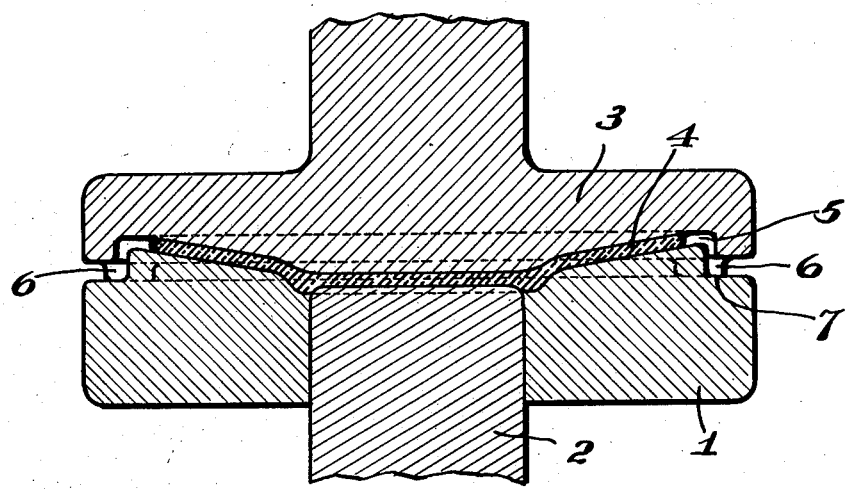

June 30, 1931.    T. H. SLOAN    1,812,564
METHOD OF PRESSING GLASSWARE
Filed April 9, 1930    3 Sheets-Sheet 1

WITNESS
A.B.Wallace.

INVENTOR
Theodore H. Sloan,
by Brown & Critchlow,
his attorneys.

June 30, 1931.   T. H. SLOAN   1,812,564
METHOD OF PRESSING GLASSWARE
Filed April 9, 1930   3 Sheets-Sheet 2

June 30, 1931.  T. H. SLOAN  1,812,564
METHOD OF PRESSING GLASSWARE
Filed April 9, 1930   3 Sheets-Sheet 3
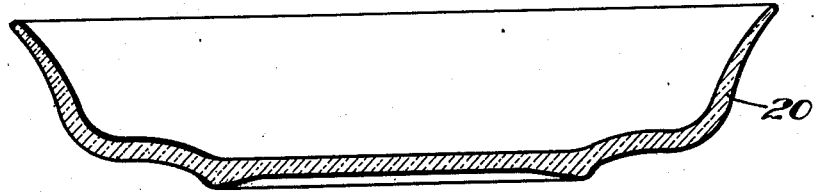
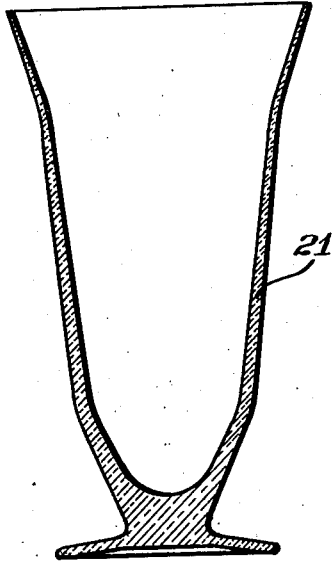
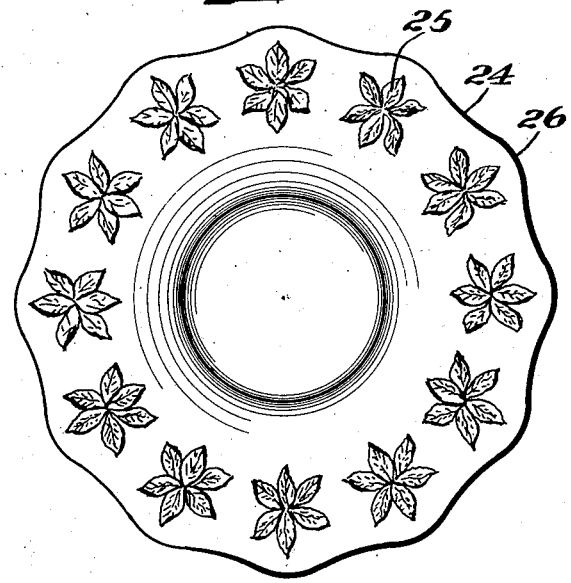
WITNESS
INVENTOR Patented June 30, 1931

1,812,564

UNITED STATES PATENT OFFICE

THEODORE H. SLOAN, OF CHARLEROI, PENNSYLVANIA, ASSIGNOR TO MACBETH-EVANS GLASS COMPANY, A CORPORATION OF PENNSYLVANIA

METHOD OF PRESSING GLASSWARE

Application filed April 9, 1930. Serial No. 442,773.

This invention relates to the pressing of glass articles, such as plates for tableware, lenses and other cover glasses for automobile and other headlights, cooking ware, berry and like dishes and bowls for tableware, tumblers, cups, etc.

This application is a continuation in part of my copending application Serial No. 386,615, filed August 17, 1929, for a method of forming round plate-like glass articles.

Heretofore glass articles of the type herein contemplated have been manufactured by placing a body, gob, or gather of molten glass in or on a mold, and causing the plunger to so press the glass that the glass entirely fills the cavity formed by and between the mold, plunger and a ring of various forms used in association with the mold and plunger. To make certain that an article thus pressed will be completely formed, or in other words that the molten glass will completely fill the mold cavity, it is customary to supply the mold with an amount of glass slightly larger than required to form the article. As a result of this, the plunger continues to exert an over-pressure on the glass after the latter has completely filled the mold, which over-pressure tends to, and in many instances actually does, particularly in the case of relatively thin ware, produce cracks on the surface of the ware. Also, due to the offsets between the several parts of the entire mold, seams are formed on the ware which can only be partially obliterated by fire polishing. These offsets at the meeting edges of the parts of a mold may not be very pronounced in a new mold which has been accurately machined, but continued use of the mold enlarges them, the molten glass so abrading the meeting edges of the parts that the life of the mold is materially shortened.

Glass plates for tableware made according to the prevailing practice are, on account of these defects, of low grade. The high grade plates are first pressed into a deep dish form, and, after being reheated, their sides are worked down to the desired forms of finished plates, this being done either manually or by spinning operations. The requisite heating of the glass to thus work them down to desired plate forms, substantially eliminates the pressing seams, but does not eliminate the cracks consequent upon the over-pressing of the glass.

The object of this invention is to provide a method of pressing glass articles to finished forms, whereby they may be made at a low manufacturing cost, and free from defects which characterize those made according to the prevailing practice.

The invention is predicated upon my discovery that by placing in a mold a body of molten glass of less volume than the article-forming cavity between the mold and plunger, the glass may, by the movement of the plunger, be caused to so flow towards, but not to, the periphery of the mold cavity that the desired finished article having nicely rounded edges is formed free from the seams and cracks which characterize like articles made according to the prevailing practice.

Figure 2:
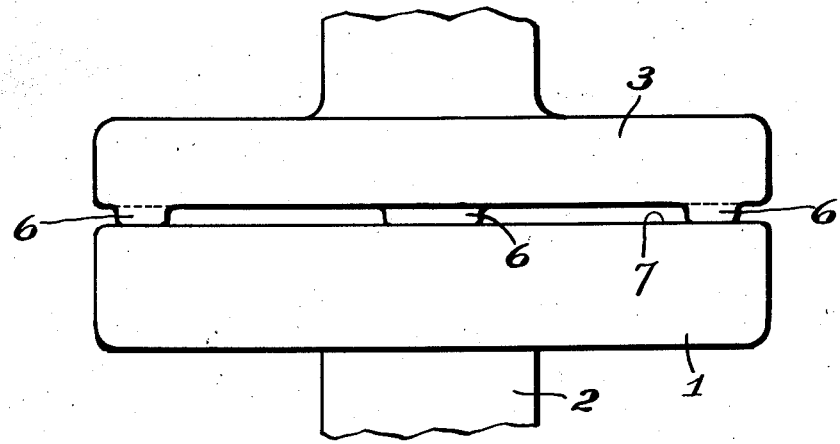
Figure 4:
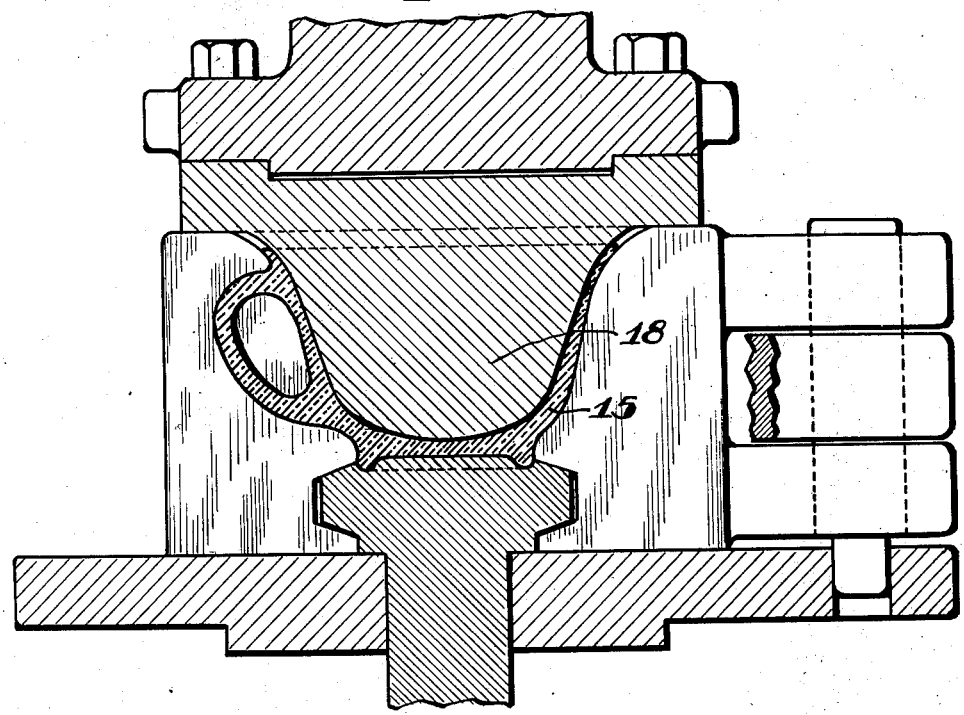
Figure 3:
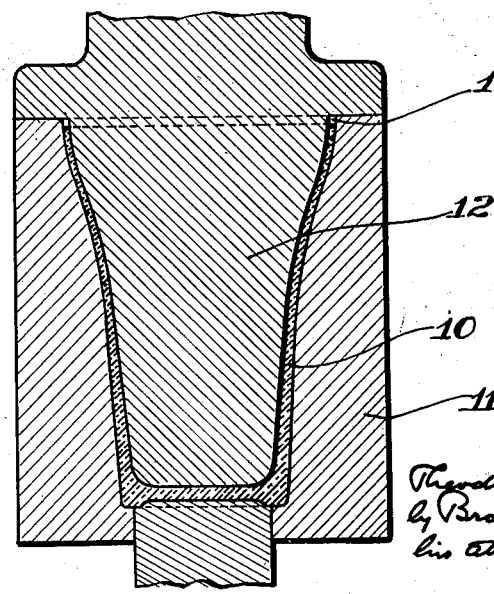

The invention will be further explained by reference to the accompanying drawings, of which Fig. 1 is a somewhat diagrammatic vertical central sectional view of a mold and plunger for pressing a plate, the parts being shown in their relative positions at the completion of a pressing operation, and with a pressed plate between them; Fig. 2 a side view of the mold shown in Fig. 1; Fig. 3 a view corresponding to Fig. 1 showing a mold and plunger for pressing a tumbler; Fig. 4 a view similar to Fig. 1 showing a mold and plunger for pressing a coffee or tea cup provided with a handle; Figs. 5 and 6 transverse central sectional views of a berry dish and footed goblet, illustrating other forms of glassware which may be made according to the invention; and Fig. 7 a face view of a plate made according to the invention and provided with a relief or embossed decoration.

In the practice of the invention as applied to the manufacture of plates, a gather of glass of less volume than required to fill the known cavity between a mold 1 (Fig. 1), having a central ejector portion 2, and a plunger 3 is so placed on the center of mold 1 that under the action of plunger 3 it spreads laterally towards the periphery of the mold cavity. In this case the glass-contacting faces of the mold and plunger are smooth, or in other words are not provided with recesses or projections for forming embossed or relief decorations on the glassware. Because the faces of the mold and plunger are smooth, and also because their faces are so formed that the mold cavity is of uniform thickness at points equi-distant from the center of the mold, the glass, when round as it rests on the mold, flows laterally to a uniform distance from the center of the mold.

I have found that the supplying of glass to a mold may be done manually by a gatherer taking glass from a tank or pot on a punty rod, and that successive gathers with but slight variations in weight may be so supplied to a mold. By use of mechanical feeders, gobs of very uniform weight may be successively deposited on the center of the mold in such a way that each spreads laterally in the desired manner under the action of the mold plunger to form articles of uniform size. If, contrary to the prevailing practice, a glass press should be so constructed that its plunger moves upwardly rather than downwardly, the gather would, of course, be placed on the plunger rather than on the mold.

After a body of glass has been placed on the center of mold 1, and plunger 3 is moved downwardly to press the glass laterally to form a plate 4 between the mold and plunger, the periphery of the plate lies within the periphery of the mold cavity, leaving an annular mold cavity space 5. To accurately position the glass-contacting face of plunger 3 at a definite distance from that of mold 1 so that plates of uniform diameter and thickness may be made from gathers of the same weight, the edge of plunger 3 is provided with a plurality of downwardly extending legs 6, preferably three in number, the bottom or bottoms of which rest upon a ledge 7 at the edge of mold 1 when a pressing operation is completed. The spaces between these legs form a passage for the escape of air from the mold cavity during pressing operations. Thus, entrapped air does not restrain the lateral flow of the glass.

As heretofore stated, the glass-pressing molds commonly used prior to my invention include, in addition to molds and plungers, rings which customarily form the edges of the articles being pressed. These rings are also usually formed to hold the pressed articles in the molds when the plungers are elevated after pressing operations, or in other words the rings are formed to prevent the pressed articles from adhering to the plungers as the latter rise. I have found in actual practice of this invention that a plunger may, by well known fluid cooling means, be maintained at a temperature sufficiently lower than the mold to prevent such adherence of pressed ware to the plunger. This may also be accomplished by making the mold and plunger, or parts of them, of different metals having different heat conductivities.

In the actual practice of this invention, a large number of plates have been made of uniform diameter having their peripheries so nearly concentric with their centers that such variations as exist are indiscernible, the plates being entirely finished by the pressing operation, except for the customary annealing. Plates and other glassware so pressed are entirely free from the seams and overpressing cracks which characterize articles pressed according to the prevailing practice, and accordingly require no fire polishing to remove such defects. Furthermore, the articles have nicely rounded edges, and are of the thickness desired. Because no offsets are formed at the meeting edges of the mold parts which come in contact with molten glass and become abraded by it, molds may be used much longer than in the prevailing practice, and, because the width of the annular space between the edge of a pressed article and the periphery of a mold cavity is immaterial, plates of different diameters, and articles otherwise of different sizes, may be pressed in the same mold by varying the size of the gathers of molten glass.

In Fig. 3 the invention is illustrated in its applicability to the pressing of a tumbler 10 between a mold 11 and a plunger 12. In pressing a tumbler 10, a gather of glass is deposited in the bottom of mold 11, the gather being insufficient to fill the cavity formed between the mold and plunger when they are in their final relative pressing positions. When the plunger descends upon the gather of glass which lies in the bottom of the mold, the glass flows upwardly around the plunger, and between it and the mold, leaving an annular mold-cavity space 13 above the upper edge of the tumbler.

As illustrated in Fig. 4, I have discovered that tea or coffee cups 15 provided with handles 16 may be pressed according to this invention between a two-part mold 17 and a plunger 18. By placing in the bottom of mold 17 a gather of glass insufficient to fill the mold cavity formed by the mold and plunger, and causing the plunger to descend upon the gather, I have discovered that the glass may be caused to flow upwardly through the cup-forming cavity, and also through the handle-forming cavity, in such a way that the glass which flows through the handle-forming cavity becomes firmly attached to the upper portion of the glass in the cup cavity. Also, I have found that, when thus pressed, the edge of the cup lies in a plane parallel with that of its supporting edge, and that there is little, if any, discernible irregularity on the edge of the cup above its handle.

Figs. 5 and 6 illustrate, respectively, a berry dish 20 and footed tumbler 21 which I have found may be manufactured according to this invention, these, and other forms of glassware illustrated herein, being merely typical of various forms of glassware which may be so made. In all cases, the glassware has the advantages explained above with particular reference to plates or plate-like articles.

When, in the manufacture of any of the forms of glassware herein contemplated, the faces of a mold and plunger are plain and smooth, as described above with reference to the plate-pressing mold of Figs. 1 and 2, the edge of the article is continuous and regular, as illustrated in the several figures thus far described. I have discovered that by forming on the glass-contacting face of the mold, or of the plunger, or both, projections or recesses for providing the edge portion of the article with embossed or relief decorations, a pleasing ornamental irregular edge may be formed on the article. This is illustrated in plate 24 shown in Fig. 7, which was pressed in a mold such as disclosed in Figs. 1 and 2, with the exception that the face of the mold adjacent to the edge of the plate to be pressed in it, was provided with recesses to form the relief decorations 25 appearing on the plate.

By thus providing the face of a mold part with a projection or recess, the cavity or space formed between the mold parts has different thicknesses along different paths of flow of glass from the center toward the edge of the cavity. I have found that the glass flows farther along the paths of greater thickness. Accordingly, by forming decorations of a repeated rather regular pattern, such as shown in the plate of Fig. 7, the resulting plate may be provided with a fluted edge, the projecting flutes 26 being beyond the edge decorations forming thicker paths of flow for the glass. By providing a mold with projections or recesses to form irregular embossed or relief decorations on the glass article, I have found that the article may be provided with a pleasing irregular edge differing from that of plate 24. Pressed glass articles other than plates and plate-like form may be similarly provided with attractive irregular edges.

A particular advantage of the invention as applied to relief or embossed decorated ware is that the decorations are not injured by any subsequent heating and working of the glass, but on the contrary retain the sharpness of their original pressed forms.

According to the provisions of the patent statutes, I have explained the principle and mode of operation of my invention, and have illustrated apparatus whereby it may be practiced. However, I desire to have it understood that, within the scope of the appended claims, the invention may be practiced otherwise than as specifically explained, and that in the practice of the invention various forms and types of molds may be used, including those having refined features of construction and design.

I claim as my invention:

1. The method of manufacturing finished pressed glassware, consisting of providing between cooperating mold and plunger members of a glass press an article-forming cavity as thick throughout its main body as at and adjacent to its edge, placing in the center of the mold a body of molten glass of less volume than said article-forming cavity; and forming from said glass an article, as thick throughout its body as at and adjacent to its edge, solely by pressing the glass between said press members and thereby causing it to flow towards but not to the outer boundary of said cavity and to chill with a permanent convexly rounded and completely finished edge.

2. The method of manufacturing finished pressed glassware, consisting of providing between cooperating mold and plunger members of a glass press an article-forming cavity as thick throughout its main body as at and adjacent to its edge, placing in the center of the mold a body of molten glass of less volume than said article-forming cavity; and forming from said glass a plate-like article, as thick throughout its body portion as at and adjacent to its edge, solely by pressing the glass between said press members and thereby causing it to flow towards but not to the periphery of said cavity and to chill with a permanent convexly rounded and completely finished edge.

3. The method of manufacturing finished pressed glassware, consisting of providing between cooperating mold and plunger members of a glass press an article-forming cavity as thick throughout its main body as at and adjacent to its edge, placing in the center of the mold a body of molten glass of less volume than said article-forming cavity; and forming from said glass an article, having a central base portion and a body portion extending upwardly therefrom and as thick throughout its body portion as at and adjacent to its edge, solely by pressing the glass between said press members and thereby causing it to flow towards but not to the outer boundary of the body-forming portion of said cavity and to chill with a permanent convexly rounded and completely finished edge.

In testimony whereof, I sign my name.

THEODORE H. SLOAN.